(12) United States Patent
Giannini et al.

(10) Patent No.: US 8,910,140 B1
(45) Date of Patent: Dec. 9, 2014

(54) METHODS AND SYSTEMS FOR TRANSFERRING DATA OVER A NETWORK

(71) Applicant: Callwave Communications, LLC, Brookline, MA (US)

(72) Inventors: David Giannini, Santa Barbara, CA (US); Scott Herriman, Santa Barbara, CA (US); Donnie Tognazzini, Santa Barbara, CA (US); Colin D. Kelley, Santa Barbara, CA (US)

(73) Assignee: Callwave Communications, LLC, Brookline, MA (US)

( * ) Notice: Subject to any disclaimer, the term of this patent is extended or adjusted under 35 U.S.C. 154(b) by 0 days.

(21) Appl. No.: 14/315,634

(22) Filed: Jun. 26, 2014

Related U.S. Application Data

(63) Continuation of application No. 13/615,039, filed on Sep. 13, 2012, now Pat. No. 8,799,886, which is a continuation of application No. 12/901,999, filed on Oct. 11, 2010, now Pat. No. 8,286,155, which is a continuation of application No. 11/040,185, filed on Jan. 21, 2005, now Pat. No. 7,818,734.

(51) Int. Cl.
*G06F 9/44* (2006.01)
*G06F 9/445* (2006.01)

(52) U.S. Cl.
CPC .. *G06F 8/65* (2013.01); *G06F 8/68* (2013.01); *G06F 8/67* (2013.01)
USPC .......................................................... 717/168

(58) Field of Classification Search
CPC .............. G06F 8/65; G06F 8/067; G06F 8/68

USPC ......................................... 717/169, 172, 173
See application file for complete search history.

(56) References Cited

U.S. PATENT DOCUMENTS

| 4,994,926 A | 2/1991 | Gordon et al. |
| 5,291,302 A | 3/1994 | Gordon et al. |

(Continued)

FOREIGN PATENT DOCUMENTS

| EP | 0 509 945 A2 | 3/1992 |
| EP | 1 120 954 | 8/2001 |

(Continued)

OTHER PUBLICATIONS

Ajmani et al., "Modular Software Upgrades for Distributed Systems," 2006 Springer-Verlag Berlin Heidelberg, ECOOP 2006, LNCS 4067, pp. 452-476; <http://link.springer.com/chapter/10.1007%2F11785477_26#page-1>.

(Continued)

*Primary Examiner* — Anna Deng
(74) *Attorney, Agent, or Firm* — Knobbe, Martens, Olson & Bear LLP

(57) ABSTRACT

A method of distributing a software upgrade to user computer systems having a software application installed thereon is disclosed. A determination is made as whether the software upgrade is to be a forced upgrade or a recommended upgrade for a first user based on a parameter related to the first user or the software upgrade. A determination is made as to whether a software upgrade file is to be downloaded to a user computer using a trickle mode or a burst mode.

19 Claims, 4 Drawing Sheets

(56) References Cited

U.S. PATENT DOCUMENTS

| | | | |
|---|---|---|---|
| 5,533,106 | A | 7/1996 | Blumhardt |
| 5,694,546 | A | 12/1997 | Reisman |
| 5,727,233 | A | 3/1998 | Lynch et al. |
| 5,805,587 | A | 9/1998 | Norris et al. |
| 5,995,603 | A | 11/1999 | Anderson |
| 6,167,567 | A | 12/2000 | Chiles et al. |
| 6,175,622 | B1 | 1/2001 | Chiniwala et al. |
| 6,208,638 | B1 | 3/2001 | Rieley et al. |
| 6,350,066 | B1 | 2/2002 | Bobo, II |
| 6,353,660 | B1 | 3/2002 | Burger et al. |
| 6,564,321 | B2 | 5/2003 | Bobo, II |
| 6,643,034 | B1 | 11/2003 | Gordon et al. |
| 6,658,100 | B1 | 12/2003 | Lund |
| 6,661,785 | B1 | 12/2003 | Zhang et al. |
| 6,708,332 | B2 | 3/2004 | Murphy et al. |
| 6,785,021 | B1 | 8/2004 | Gordon et al. |
| 6,857,074 | B2 | 2/2005 | Bobo, II |
| 7,003,554 | B1 | 2/2006 | Turner et al. |
| 7,080,371 | B1 * | 7/2006 | Arnaiz et al. ............ 717/170 |
| 7,106,843 | B1 | 9/2006 | Gainsboro et al. |
| 7,134,049 | B2 | 11/2006 | Gillenwater et al. |
| 7,353,428 | B2 | 4/2008 | Cheston et al. |
| 7,363,384 | B2 | 4/2008 | Chatani et al. |
| 7,437,428 | B1 | 10/2008 | Muti et al. |
| 7,502,849 | B2 | 3/2009 | Roberts et al. |
| 7,716,276 | B1 * | 5/2010 | Ren et al. ............ 709/203 |
| 7,770,168 | B1 | 8/2010 | Howarth et al. |
| 7,797,694 | B2 | 9/2010 | Sonbarse et al. |
| 7,818,734 | B2 | 10/2010 | Giannini et al. |
| 7,840,957 | B2 | 11/2010 | Kumashiro et al. |
| 8,286,155 | B1 | 10/2012 | Giannini et al. |
| 2001/0004741 | A1 | 6/2001 | Sogo |
| 2002/0002704 | A1 | 1/2002 | Davis et al. |
| 2002/0143788 | A1 | 10/2002 | Hermann et al. |
| 2003/0055925 | A1 | 3/2003 | McAlinden |
| 2003/0063731 | A1 | 4/2003 | Woodring |
| 2003/0066065 | A1 | 4/2003 | Larkin |
| 2003/0123629 | A1 | 7/2003 | Hussain et al. |
| 2003/0156700 | A1 | 8/2003 | Brown et al. |
| 2003/0167373 | A1 | 9/2003 | Winters et al. |
| 2004/0010786 | A1 | 1/2004 | Cool et al. |
| 2004/0098715 | A1 | 5/2004 | Aghera et al. |
| 2004/0143628 | A1 | 7/2004 | Bradford et al. |
| 2004/0153538 | A1 | 8/2004 | Champlin |
| 2004/0154014 | A1 | 8/2004 | Bunger |
| 2004/0237078 | A1 | 11/2004 | Weiss et al. |
| 2005/0044280 | A1 | 2/2005 | Reisman |
| 2005/0068893 | A1 | 3/2005 | Roberts et al. |
| 2005/0091398 | A1 | 4/2005 | Roberts et al. |
| 2005/0166246 | A1 | 7/2005 | Calmels et al. |
| 2005/0203968 | A1 | 9/2005 | Dehghan et al. |
| 2005/0210459 | A1 | 9/2005 | Henderson et al. |
| 2005/0216910 | A1 | 9/2005 | Marchand |
| 2005/0265322 | A1 | 12/2005 | Hester |
| 2006/0080656 | A1 | 4/2006 | Cain et al. |
| 2006/0130045 | A1 | 6/2006 | Wesley et al. |
| 2006/0265708 | A1 | 11/2006 | Blanding et al. |
| 2006/0271926 | A1 | 11/2006 | Hutton et al. |
| 2007/0067763 | A1 | 3/2007 | Sonbarse et al. |
| 2007/0083766 | A1 * | 4/2007 | Farnham et al. ............ 713/176 |
| 2007/0150892 | A1 | 6/2007 | Chaney |
| 2007/0245342 | A1 | 10/2007 | Lee et al. |
| 2007/0294684 | A1 | 12/2007 | Kumashiro et al. |
| 2009/0119659 | A1 | 5/2009 | Zou et al. |
| 2010/0058313 | A1 | 3/2010 | Hansmann et al. |
| 2010/0211942 | A1 | 8/2010 | Deverakonda Venkata et al. |
| 2012/0192172 | A1 | 7/2012 | Hansmann et al. |

FOREIGN PATENT DOCUMENTS

| | | |
|---|---|---|
| EP | 1 213 647 A1 | 6/2002 |
| EP | 1 282 036 A2 | 2/2003 |
| JP | 10-513632 | 12/1998 |
| JP | 11-506292 | 6/1999 |
| JP | 2001-168989 | 6/2001 |
| WO | WO 96-18948 | 6/1996 |
| WO | WO 97-26749 | 7/1997 |
| WO | WO 01-76210 | 10/2001 |
| WO | WO 03-063533 A2 | 7/2003 |

OTHER PUBLICATIONS

Biswas, Pratik K., "Autonomic Software Release Management for Communications Network," 2007 IEEE, pp. 179-188; <http:ieeexplore.ieee.org.stamp.jsp?tp=&arnumber=4258534>.

Dumitras et al., "To Upgrade or Not to Upgrade: impact of online upgrades across multiple administrative domains", 2010 ACM, Oct. 2010, pp. 865-876 <http://dl.acm.org/citation.cfm?doid=1932682.1869530>.

Fung et al., "Quality Factors for dynamic Evolution in Composition-Based Distributed Applications," 2011 ACM, vol. 42, No. 1, Feb. 2011, pp. 29-58; <http://dl.acm.org/results.cfm?h=1&cfid=306190984&cftoken=17695186>.

La Manna, Valerio Panzica, "Dynamic Software Update for Component-based Distribution System," 2011 ACM, WCOP 11, Jun. 20-24, 2011, Boulder, CO, USA, pp. 1-8; <http://dl.acm.org/results.cfm?h=1&cfid-400431127&cftoken-92652222>.

Li et al., "A Next-Gen Network Switch Software Automation Upgrade Method Based on a Two-step Inference Expert System", 2009 IEEE, pp. 161-165 <http://ieeexplore.ieee.org/stamp/stamp.jsp?tp=&arnumber=5077019>.

Microsoft® Windows® Server Technical Article; "*Background Intelligent Transfer Service*"; Microsoft Corporation; Published Aug. 2002; pp. 1-18.

Moser et al., "Online Upgrades Become Standard", 2002 IEEE, COMPSAC'02, pp. 1-7<http://ieeexplore.ieee.org/stamp/stamp.jsp?tp=&arnumber= 1045134>.

Oracle, "Managing System and Applications Software with Oracle Solaris 11 Express", Nov. 2010, Oracle Corporation, pp. 1-10 <http://www.oracle.com/technetwork/articles/servers-storage-admin/s11managingsw-186783.pdf>.

Sameer Ajmani, "Automatic Software Upgrades for Distributed System", Oct. 6, 2005, Massachusetts Institute of Technology, pp. 1-164 <http://publications.csail.mit.edu/tmp/MIT-CSAIL-TR-2005-061.pdf>.

Vartiainen et al., "Auto-update—A Concept for Automatic Downloading of Web Content to a Mobile Device", 2007 ACM, pp. 683-689 <http://dl.acm.org/citation.cfm?id=1378179>.

Wang et al., "Dynamic Software Upgrading for Distributed system Based on R-OSG," 2008 IEEE, pp. 227-231; <http://ieeexplore.ieee.org./stamp/stamp.jsp?tp=&arnumber=4722329>.

* cited by examiner

METHODS AND SYSTEMS FOR TRANSFERRING DATA OVER A NETWORK

PRIORITY CLAIM

This application is a continuation of U.S. application Ser. No. 13/615,039, filed Sep. 13, 2012, which is continuation of U.S. application Ser. No. 12/901,999, filed Oct. 11, 2010, now U.S. Pat. No. 8,286,155, which is a continuation of U.S. application Ser. No. 11/040,185, filed Jan. 21, 2005, now U.S. Pat. No. 7,818,734, the contents of which are incorporated herein by reference in their entirety.

BACKGROUND OF THE INVENTION

1. Field of the Invention

The present is related to transferring data, and in particular to transferring data between computers, over a network.

2. Description of the Related Art

As the use of the Internet has increased, it has become more common for users to download application programs from a remote server system to their personal computer system. Of course, application programs can be loaded by users using more conventional methods, such as by loading the application from a CD-ROM.

Often, an application can be superseded by an updated version of the application. For example, the new version can fix bugs, provide enhanced security, or additional features. Conventionally, the user may need to visit a Web site, and determine what updates are available, manually select the update, and manually request that the update be downloaded to the user's computer. With some conventional systems, the application program may automatically determine if updates are available, and then download the updated version.

Many conventional update systems download the update to the user's computer using the maximum available or needed user network bandwidth and computer resources. Other conventional systems may download updates in a trickle manner so as not to utilize all of a user's network bandwidth. However, many of the foregoing conventional systems treat all end-users the same, such that if an update systems uses a trickle download process for a given update, the trickle download process is used for all users, while if the download process utilizes all available or needed resources, it will utilize all available or needed resources for all users for whom the update process is being performed.

SUMMARY OF THE INVENTION

As described herein, embodiments of the present invention provide for flexible downloading or transferring of files, such as files of upgraded programs of previously installed programs, from one computer system to another computer system. Certain embodiments provide for forced or permission based download and/or upgrade processes, and provide for trickle and/or burst transfer of files, including upgraded application files.

One embodiment provides a method of distributing a software upgrade to user computer systems having a software application installed thereon, the method comprising: determining that a software upgrade is to be performed relative to the software application; determining whether the software upgrade is to be a forced upgrade or a recommended upgrade for a first user based on a parameter related to the first user or the software upgrade; and determining if a software upgrade file is to be downloaded to a first user computer system using a trickle mode or a burst mode. Another embodiment provides a method of distributing a software upgrade to user computer systems having a first version of a software application installed thereon, the method comprising: determining that the first version of a software application is to be upgraded; downloading to and installing a first software upgrade application file on a first set of user computers having the software application without requesting permission from the users of the first set of user computers, wherein the first software upgrade application file is an upgrade for the first version of the software application; and installing the first software upgrade application file on a second set of user computers having the software application after requesting and receiving permission from the users of the second set of user computers.

Still another embodiment provides a computer-readable medium comprising: a computer program that, when executed, causes a computer to: determine that a first version of a software application is to be upgraded; after making the determination, download to and cause the installation of a first software upgrade application file on a first set of user computers having the software application without requesting permission from the users of the first set of user computers, wherein the first software upgrade application file is an upgrade for the first version of the software application; and after making the determination, cause the installation of the first software upgrade application file on a second set of user computers having the software application after requesting and receiving permission from the users of the second set of user computers.

Yet another embodiment provides a computer-readable medium comprising: a computer program that, when executed, causes a computer to: determine whether a software upgrade is to be performed for a software application; determine whether the software upgrade is to be a forced upgrade or a recommended upgrade for a first user based on a parameter related to the first user or the software upgrade; and determine if a software upgrade file is to be downloaded to a first user computer system using a trickle mode or a burst mode.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

DETAILED DESCRIPTION OF PREFERRED EMBODIMENTS

Figure 1:
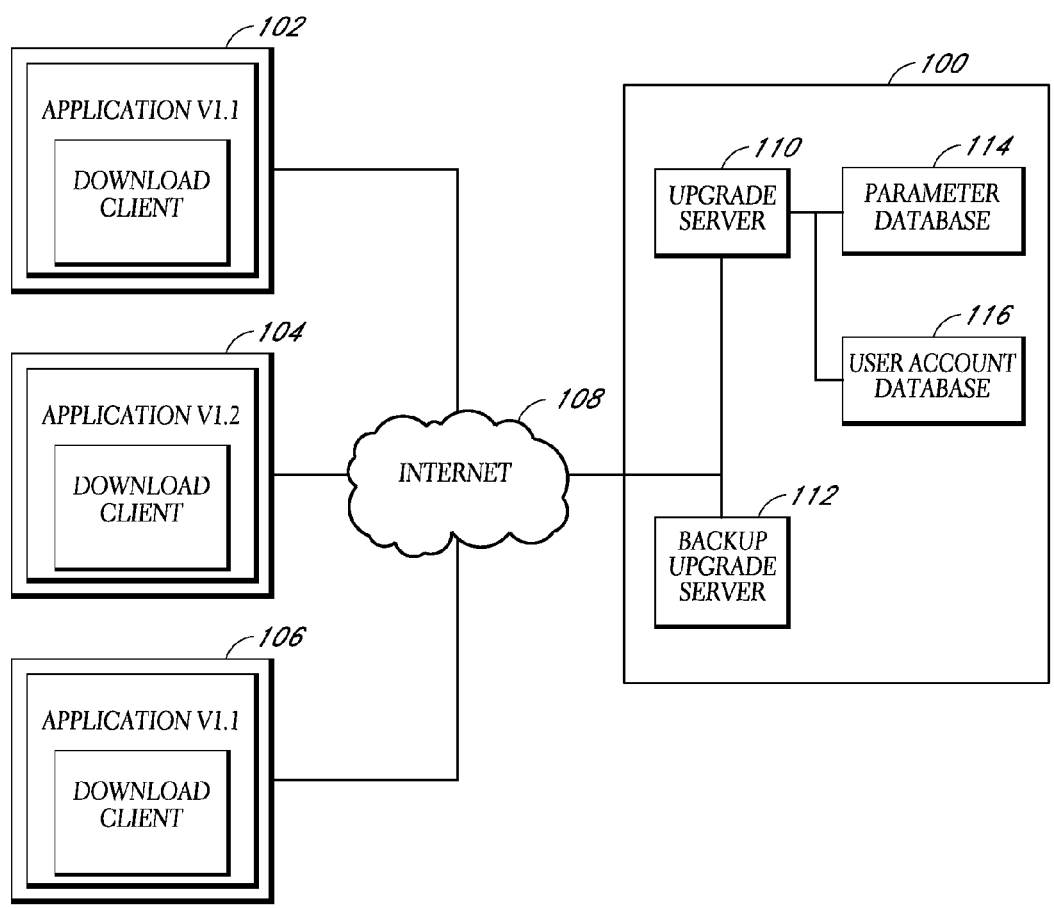
FIG. 1 illustrates an example upgrade system connected to a plurality of user terminals.

The present is related to transferring data, and in particular to transferring data between computers, over a network.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networks of interactive televisions or of telephones, and other protocols may be used as well.

In addition, unless otherwise indicated, the functions described herein are preferably performed by executable code and instructions stored in computer readable memory and running on one or more general-purpose computers. However, the present invention can also be implemented using special purpose computers, state machines, and/or hardwired electronic circuits. Further, with respect to the example processes described herein, not all the process states need to be reached, nor do the states have to be performed in the illustrated order. Further, certain process states that are illustrated as being serially performed can be performed in parallel.

Similarly, while the following examples may refer to a user's personal computer system, other computer or electronic systems can be used as well, such as, without limitation, an interactive television, a networked-enabled personal digital assistant (PDA), other IP (Internet Protocol) device, a cellular telephone, a networked navigation system, a networked game console, a networked MP3 device, a networked entertainment device, and so on. In addition, while the following examples refer to downloading upgraded versions of software or executable files, processes disclosed herein can be used for transferring or downloading other types of files.

As described herein, embodiments of the present invention provide for flexible downloading or transferring of program files from one computer system, such as a server, to another system, such as a personal computer, over a network, such as the Internet. In addition, certain embodiments provide flexible upgrade processes for updating a user's computer system with a new program or updated version of a program.

By way of example and not limitation, the program can be an application, such as a client application used to provide telecommunications services. By way of illustration, the client application can be used to notify a user of previously recorded messages, can allow a user to screen and listen in substantially real time as a caller is leaving a message on a call processing system, and can enable the user to instruct the call processing system to direct an incoming call to a specified or selected terminal. Other example applications can include a browser, a wireless phone operating system, a personal computer operating system, a word processing program, an email program, a photo editing program, a browser, and so on.

The download process can be performed in a variety of ways, such as in a burst mode or a trickle mode. By way of example, a trickle download process can include downloading from a remote computer system, such as an upgrade system server, to a local or client computer system an updated software application in relatively small chunks. Some or all of the chunks are optionally transmitted by the server to the client computer system spaced in part in time at a minimum predetermined time interval. This moderates the usage of the client computer system resources, allowing the client system to run foreground processes without undue interference by the trickle download process. In addition or instead of providing upgrades, the upgrade system server can be used to download or transfer other types of files, documents, and media.

Optionally, in order to tune the trickle download, the chunk size (which is optionally specified in bytes requested at a time, although other units can be used) and sleep time (seconds or other time units to sleep between chunk requests) are configurable on the upgrade system server on a global basis or on a per user basis. Optionally, default values can be set for the chunk size and/or the sleep time.

By way of further example, the burst download process optionally will not attempt to moderate or to significantly moderate the utilization of the client computer system resources during the application or update download, and will instead download the update as quickly as the available resources will allow. For example, a burst mode will not restrict the chunk size, or may permit a much larger chunk size than the trickle mode, such as a chunk size that is five, ten, twenty, one hundred, or a thousand times (or other integer or non-integer multiple greater than one) the trickle mode chunk size.

Trickle and/or burst downloads can be configured to retrieve a different version for each installation of the application being upgraded, or the same upgrade version can be used each for each installation of the application being upgraded.

Once the new program file or update has been downloaded from the remote server computer, an upgrade installation process is performed. For example, the upgrade process can include copying files and adjusting settings.

A download and/or an upgrade can be recommended or forced/required. When a download is recommended, the user is allowed to choose or determine if the upgrade is to be performed. For example, if the upgrade system server has an upgraded version of an application, the server can ask the user (directly or indirectly), or, via a communication to a user client application, cause the user to be asked for the user's permission or approval, before the upgrade version of an application is downloaded to the user's computer system. If the user chooses not to have the upgrade performed, the download of the upgraded application file (which can be an executable file) and the installation of the upgraded version of the application are not performed. Alternatively, for a recommended upgrade, an upgraded version of an application can be downloaded without the user's permission, but the installation of the upgrade version will not be performed without the user's permission.

An upgraded version of an application does not necessarily have to be a new version of the application. Indeed, the upgraded version can be an older version of the application than that already installed on the user's computer system, wherein the older version can have some advantage, such as the absence of a bug or security flaw that is present in a later version of the application.

When a download is forced, the download and upgrade are performed without asking the user if the user wants the given download and/or upgrade performed. In an example embodiment, the server transmits an indication to a download client application, which manages the download process from the user client computer system side. The indication indicates to the download client that the download and upgrade should be performed without asking the user for permission to proceed. However, the user can optionally be informed that the download and/or upgrade is being performed, and can further optionally be informed as to how long the download and/or upgrade will take, and the status of the download and/or upgrade.

For a given software application, such as a telecommunications client, a media player, a word processor, or other application, different user computer systems may host different versions of the application. For example, several computer systems may host version 1.0 of a given application, while other computer systems may host version 1.1 or 1.2 of the application.

Optionally, some versions of a given application can be designated to receive a recommended download and/or upgrade, and some versions of the application can be designated to receive a forced download and/or upgrade. Thus, recommended versus forced download and\or upgrade is configurable on the server per application version. For example, certain versions of an application may have a critical security flaw and so it is more imperative that these versions be upgraded. Other versions of the application programs may not have the critical security flaw. Therefore, the versions with the critical security flaw may be designated to receive a forced download and upgrade, and the versions without the critical security flaw may be designated to receive a recommended download and upgrade.

A recommended upgrade or a forced upgrade can selectively be performed using a trickle download or a forced download process. Optionally, a trickle download can be converted to a burst or forced download and vise versa during a download process by an upgrade system manager, automatically in response one or more conditions, such as the number of incomplete downloads detected within a predetermined amount of time, time of day, in response to a user instruction on the client side, or otherwise.

One or more upgrade and download parameters can be configurable on a system-wide basis, and/or on an individual end-user basis. The parameters can then be stored in computer readable memory, such as in an upgrade server database. For example, the parameters can be used to enable or disable the download process; specify a time period to wait or sleep between transmitting chunks in a download trickle process; specify a resource locator suffix to be added to a trickle download URL (Uniform Resource Locator); specify a start date and/or time for an upgrade window; specify an end date and/or end time for an upgrade window; specify a maximum number of downloads to be performed or allowed in a specified period of time (such as per minute, per half-hour, or per hour); specify an interval at which a determination is made as to what the current upgrade rate is; specify an application burst download address or locator (such as a URL); specify if the download is to begin immediately at the start of a session or delayed a specified period of time after the start of a session; specify if any login sessions should be skipped; specify a time period in which a trickle upgrade will be converted to a forced or burst; specify an application login enable parameter (which, when set to off will deny all or specified services of a given type [such as, by way of example and not limitation, selected telecommunication services including one or more of: call answering; message recording; recorded message retrieval; call screening; caller identification, call forwarding; and so on] if the user does not grant permission to upgrade); specify a desired client identifier; specify whether an download and/or upgrade is recommended or is to be forced; specify whether a download is to be performed in trickle mode or in burst mode; specify whether a status/success dialog box is to be displayed to the user during and/or at the completion of the upgrade; specify a logical or other expression used to determine which user(s) are to have their application updated and/or which application versions are to be updated, wherein the logical expression or another logical expression can be used to determine if an upgrade is to be forced or recommended, and/or if the upgrade is to be performed in burst or trickle mode.

Advantageously, by specifying a resource locator (such as a URL and URL suffix), the system can redirect the download to come from a different DNS (Domain Name Server) name, and hence enables the distribution of bandwidth consumption across one or more resources. In addition, the ability to specify a resource locator provides a level of security to better ensure that download requests are not pointed to an incorrect or improper server that may be operated by a malicious operator. If a malicious or improper condition is detected, the download system can quickly recover by changing the resource locator suffix.

Example optional configuration parameters are illustrated in Tables 1 and 2 below. Some or all of the parameters can be set globally, that is, the parameters are generally used for an application download, without taking into account which older versions are on a client computer system. Some of the parameters can optionally be set for a specific program version. For example, the parameters in Table 1 can optionally be set on a global basis, and the parameters in Table 2 can optionally be set on a per program version-basis.

TABLE 1

| Configuration Parameter Name | Description |
| --- | --- |
| upgradesOn | Turns the upgrade process off. |
| trickleChunkBytes. | The size, in bytes, of the chunk to download when trickle downloading the application. Optionally, the size can be varied during the download up to or equal to the size specified by the trickleChunkBytes value. |
| trickleSleepMilliseconds | Trickle download parameter. The time period, in number of milliseconds, to sleep between downloading each chunk. |
| trickleDownloadURLSuffix | Trickle download resource locator suffix, which, for example, can be a 0-3 character string to be added to the trickle download URL string. |
| upgradeWindowBeginHour | The hour the upgrade window opens. |
| upgradeWindowBeginMinute | The minute the upgrade window opens. |
| upgradeWindowEndHour | The hour the upgrade window closes. |
| upgradeWindowEndMinute | The minute the upgrade window closes. |
| maxUpgradesPerHour | The maximum number of upgrades that will be performed and/or attempted per hour. |
| upgradeIntervalInSeconds | How often the download system checks to determine if the system is performing upgrades at the correct or appropriate rate so as to spread maxUpgradesPerHour out relatively evenly. |
| upgradeDuringKeepalive | If true request clients will be told to download and upgrade during their login session. |
| UpgradeSessionStartMinute | How soon after the start of a session the upgrade process will begin |
| Burst Download application http://www.callwave.com/iam/Upgrade.exe | Optionally, a single burst download application is available on the website. Optionally, all burst downloads will retrieve the same application version. |

TABLE 2

| Database Column | Description |
| --- | --- |
| allowLogin | Login can be turned on or off for a single client version. |
| desiredClientVersion | The new desired client version identifier. can be specified. |
| upgradeRequired | Specifies whether the download is recommended or forced (required). |
| trickleDownload | Specifies whether the download is to be performed in trickle mode or in burst mode. |
| confirmationDialog | An optional dialog can be displayed at the end of the upgrade indicating success. |
| targetingExpr | A targeting expression can be used to target the upgrade to a specific client version. |

When an upgrade is to be performed, not all installed versions of a given application are necessarily upgraded. For example, upgrades may selectively be provided to users having a certain class or grade of service. By way of illustration, if the upgrade includes a new feature that is only to be available to users who are subscribers to a certain premium level of service, then optionally the upgrade will only be provided to those subscribers having a certain level of service or higher. By way of further example, some users may have an installed version of a given application with a significant or critical flaw, while other users may have a different installed version without the flaw. By way of another example, an upgrade may incorporate certain features, such as encryption, which may not be provided to certain countries. Therefore, users in a first set of countries may get a first upgrade version, while users in another set of countries may get a different upgrade version, with a different feature set and/or missing features present in the first upgrade version.

By way of illustration and not limitation, one or more of the following parameters or factors listed in Table 3, or other attributes stored in the data store can be used to determine whether a user or set of users will receive an upgrade, and if so, which upgrade version. In addition, one or more of the following parameters can optionally be used to determine whether an upgrade for a given user or set of users is to be forced or recommended, and/or whether a download is to be performed in trickle mode or burst mode.

TABLE 3

Version of currently installed application on user system
Bug, fault and/or deficiency data for currently installed
version of application on user system
User account profile: level of software maintenance for a
given user or set of users
User account profile: level of related services (such as
telecommunication services) associated with application being upgraded
User account profile: is user a member of a group account
User account status (for example, is user's account balance current,
or is user payment delinquent)
User phone number(s)
Geographical location and/or country of the user, or the location
of user system hosting the application to be upgraded
User network access-mechanism (for example, dial-up,
cable, DSL, T1, etc.)
User hardware-performance (level of performance of user system)
User system type (for example, Intel Pentium compatible system,
ARM-based system, Microsoft Windows CE-compatible
PDA or phone, Microsoft-Smartphone compatible
phone, Palm OS-compatible phone or PDA, etc.)
Operating system of user system (for example, Windows 2000,
Windows ME, Windows XP, Apple pre-OS X, Apple OS X,
Linux, Solaris, etc.)
Type of browser installed on user system (for example, Microsoft
Explorer, Mozilla Firefox, Apple Safari, Opera, etc.)
Presence of selected plug-ins on user system (for example, FLASH,
QuickTime, etc.)
Available hard disk space and/or other available non-volatile
memory space of user system
Available RAM and/or working memory on user system
User language The upgrade system can determine what version of software a given user has via a variety of techniques and processes. For example, the upgrade system can access a database that keeps track of, and stores data indicating which was the last version of the software downloaded and/or installed by a given user computer system and/or registered by a given user. By way of further example, the upgrade system can periodically send out queries to users and/or user computer systems requesting information identifying the version of the software currently installed. Optionally, the software to be upgraded can periodically transmit version identification information to the upgrade system or a system accessible by the upgrade system. Still other techniques and processes can be used.

In order to determine whether a download and/or upgrade is to be performed, the upgrade system server performs one or more of the following example operations. The server will read an upgrade enable parameter, which indicates whether all upgrading is currently disabled for a given software application. If the upgrade enable parameter indicates that all upgrading is currently disabled, then upgrades will not be performed. If the upgrade enable parameter has an enable indication, then the upgrade system server will read from the server database upgrade window parameters associated with a given pending upgrade, which can include one or more of a start date, start time, end date, end time. If the current time is outside the time window, then the upgrade will not be performed at that time. If the upgrade is within the upgrade window, then the upgrade process can be performed if other appropriate conditions are met, such as if selected parameters from Table 3 are met.

By way of example, downloads and upgrades are optionally targeted to specific users or selected subsets of users. A separate targeting expression can optionally be configured for each application version being upgraded, wherein a given version will be upgraded if the targeting expression evaluates to true. The targeting expression can be based on one or more of the parameters in Table 3, including, by way of example, user account status, user account profile, currently installed version of application, and user phone number.

Optionally, the targeting expression can be a logical expression including one or more of the logical operators: AND, OR, XOR, NOT, as well as mathematical expressions, and relationship expressions, such as ">", "<", "=", and so on.

An example logical expression is a follows:

Targeting Expression=True if(currently_installed_version is >1.1)AND
(software_maintance_subscriber=True)AND
(country_of_use=USA).

Thus, in the above example, the targeting expression is true, and hence an upgrade will be performed, for a selected user if the user currently has the application installed with a version greater than 1.1, has software maintenance provisioned, and has the software to be upgraded installed on a computer system located in the United States.

Optionally, a maximum number of downloads and/or upgrades per hour (or other time period) parameter can be specified. If it is specified, then the upgrade system server is configured to initiate or perform no more than the maximum number of downloads and/or upgrades per hour. If the maximum is met within a given specified time period, then no additional downloads will be initiated during the specified time period. Optionally, the initiation of downloads by the upgrade system server is spread fairly evenly throughout the time period so as to reduce peaks in demands on the upgrade system server.

Several example download and upgrade processes will now be discussed. As discussed above, the download mode (burst or upgrade) is configurable in an upgrade server database for each version of the software application that is to be upgraded. Optionally, a selected subset of users and/or systems with the installed application can all receive the same URL for the same upgrade version, while other users and/or systems with the installed applications can receive a different URL for a different upgrade version.

Once the URL is received by the upgrade client (which can be the targeted application to be updated), the user system can request the update by accessing the corresponding URL. By way of example, the URL can optionally be associated with a Web site hosted by a server operated by call processing service provider. A progress meter or indicator can optionally be presented on a user's computer during a download process and/or during installation of a downloaded application upgrade.

In an example embodiment, as part of an installation and upgrade process, an upgrade server retrieves the appropriate forced/recommended and burst/trickle parameters from an upgrade server database or other data store, transmits the appropriate forced/recommended indication to upgrade clients on user computers, transmits to the upgrade clients the location, such as a URL, from which the upgrade clients can request the appropriate upgraded version of the application program. The upgrade client can actually be part of the software application being upgraded, can be a separate discrete program, or can form part of the functionality of another program, such as an operating system.

Optionally, each upgrade client, or each upgrade client in a selected set of upgrade clients, can be provided with: the same URL, so that each upgrade client will request the same upgrade version from the same server; with a different URL, allowing each upgrade client to request a different upgrade version; or with a different URL, wherein each URL accesses the same upgrade version but from a different server. Then, in response to upgrade client requests, the upgrade server(s) transmits to the upgrade clients the appropriate version of the application.

With respect to a recommended upgrade, a given recommended application upgrade can be performed using a trickle download processes or a burst download process. If the server is instructed or determines that a download of a recommended upgrade is to be performed in trickle mode, then in response, the download of the upgraded version of the application can optionally be performed without asking the user's permission to download the upgraded version of the application, as similarly described above. Because the trickle download process utilizes relatively little of the user's computer system resources over a given period of time, the trickle download process is less likely to interfere with the user's use of the computer system for other purposes. Therefore, it may be considered relatively unnecessary to ask the user's permission to perform the trickle download of the recommend upgraded version of the application.

In this example, the trickle download process will end upon the earlier of: the trickle download completes; the user computer system goes off line; and the download client receives a "404 Not Found" error message or the like when fetching a chunk for the download server. The download server will provide a 404 error message or the like upon receipt of a request for a URL that the server does not have (which may occur if the upgraded version of the software application has been deleted from the upgrade server).

If the upgrade is recommended, after the trickle download of the upgraded version of the software application is complete, a dialog box or other prompt can be presented to the user by the download client, asking the user for permission to install the downloaded application. The dialog box or other prompt can be presented immediately after the download is complete, or at a later time, such as after a reboot of the computer system, after exiting and then re-launching or logging-in of the application being upgraded, and so on. If the user responds affirmatively to the permission request, the installation, including executing an executable file, file copying, settings, and/or shortcut migration, is performed on the user's computer system. Alternatively, if the server is instructed that a download/recommended upgrade process is to be performed in trickle mode, then in response, the download can optionally be performed only after asking for and receiving the user's permission to perform the download and/or upgrade.

Optionally, in order to insulate the user from the upgrade process, the user is not presented with a download progress meter when the download process is being performed and/or when the downloaded application file is being installed. If an attempt is made by the user to launch the application while the upgrade process is in progress, a notice, which can be in the form of a web page, may optionally be presented to the user indicating that an upgrade is in progress. The user may optionally be prevented from launching the application. When the upgrade installation process is complete, a notification may be provided to the user indicating the upgrade process is complete. The upgraded software application will appear as an icon and/or text on the user's computer desktop or other appropriate location. The user can then launch and use the upgraded software application.

If the upgrade is recommended, and if the upgrade server is instructed that a download of a recommended application upgrade is to be performed in burst mode (which places more of a load on the user's computer system resources, and hence is more likely to interfere with the user's use of the computer system and may be more noticeable to the user than a trickle download), then in response, a dialog box or other prompt can be presented to the user by the download client. The prompt can ask the user for permission or authorization to download and/or install the upgraded version of the application. If the user responds affirmatively, the download of the upgraded version is performed using a burst download process.

Optionally, once the burst download is complete, because the user had already given permission, the installation of the upgraded version can be performed without asking further permission from the user. The installation can be performed immediately after the download is complete, or at a later time, such as after a reboot of the computer system, after exiting and then re-launching of, or logging-in to the application being upgraded, and so on. Alternatively, the upgraded version can be downloaded without first asking the user's permission, and once the download is complete, the user can be asked for permission to install the upgraded version of the software application.

If a failure occurs during a burst download the application that was to be updated logs the exception and displays a message regarding the failure to the user. The partial download is optionally automatically removed from the user's system by the upgrade client.

With respect to a forced upgrade, if the server is instructed that a download of a forced upgrade is to be performed in trickle mode, then in response, the download of the upgraded version of the application can be performed without then asking the user's permission to download the upgraded version. After the trickle download of the upgraded version of the application is complete, and without asking for user permission, the installation of the upgraded version can be immediately and automatically be performed. Optionally, the installation can instead be performed at a later time such as after a reboot of the computer system, after exiting and then re-launching of, or logging-in to the application being upgraded, and so on.

With respect to a forced upgrade, if the server is instructed or otherwise determines that a download of a forced application upgrade is to be performed in burst mode, then the download of the upgraded version is performed using a burst download process and without the user's permission. Once the burst download process is complete, the installation of the upgraded version of the software application can be immediately performed, or the installation can be automatically performed at a later time, such as after a reboot of the computer system, after a re-launch of, or log-in to the application being upgraded, and so on.

A comparison of download times using a burst download and a trickle download will now be provided to illustrate the difference in time of the processes.

For the burst download:
assuming the user computer has 56K modem providing 33Kbps real throughput, and that the upgrade is 700 Kbytes in size, then the download time can be calculated as follows:

700K/[(33K bits/second)/(8 bits/byte)]

=700K/(4.125K/second)=2.82 minutes

With respect to the trickle download, assuming:
chunk size=2Kbytes
sleep time=5 seconds sleep between chunk requests
assuming the user computer has 56K modem providing 33Kbps real throughput, and that the upgraded software to be downloaded is 700 Kbytes in size, then the download time can be calculated as follows:
a 2Kbytes chunk will typically take a bandwidth burst of about half (0.5) a second; (alternating 0.5 seconds of network usage with 5 seconds of sleep should not degrade the user's network performance so as to be easily perceptible by the user.)

[2K/(33K bits/second)]*(8 bits/byte)=2K/(33K/second)

~=0.48 seconds.

Assuming that the upgraded software to be downloaded is 700 Kbytes in size, the download time can be calculated as follows:

700K*(5 s+0.5 s)/2K

=350*5.5 s=1925 s=32.083 minutes

Thus, in this example, the trickle download time is more than ten times as long as the burst download time. Of course this ratio will change based on the trickle chunk size, sleep time, etc.

With respect to trickle mode downloads, due to the length of time that a trickle upgrade may take, the download client optionally allows the download to occur across as many sessions as needed to download the upgrade version of the software application. If a partially download file of one version of the upgraded software application is already stored on a user's computer system, and the user's computer system's upgrade client is instructed by the upgrade system server to another version of the application software, the partially downloaded file is optionally deleted by the download client and the new version begins to trickle download from the upgrade server. This ensures that there will not be multiple stored versions of the software, unnecessarily taking up non-volatile memory space.

Failures during the trickle download are optionally logged to an event log. In order to insulate the user from the failure, the user is optionally not informed of the failure. If the download client loses connectivity to a first upgrade server from which the download is occurring, the download client automatically attempts to retry the connection. If a connection cannot be established to the first upgrade server after a predetermined number of attempts, the download client optionally attempts to retrieve the new version from a backup server.

In order to prevent a defectively downloaded application file from being used, the upgrade client verifies the download application file is valid before performing the upgrade installation. For example, the validation can be performed by calculating a checksum or the like for the downloaded application file and comparing the calculated checksum with a checksum provided by the upgrade system server. If the downloaded software application file fails validation, optionally the downloaded file can be deleted by the upgrade client, and optionally the upgrade client can automatically begin the trickle download process again by re-submitting the download request to the upgrade system server.

FIG. 1 illustrates an example upgrade system 100 coupled to a plurality of user computer systems 102, 104, 106, via a network 108. In this example, each of the computer systems includes a version of an application, however systems 102 and 106 have version 1.1 of the application, and system 104 has version 1.2 of the application. In this example both versions of the application include an upgrade client.

The upgrade system 100 can optionally be associated with or operated by a telecommunications or call processing service provider. In this example, the upgrade system 100 includes an upgrade sever 110 (which can further include or be coupled to a session manager), a backup upgrade server 112, a parameter database 114, and a user account database 116. As described herein, the upgrade system can selectively distribute software upgrades to many users, using forced and permission-based upgrades, and in burst mode or in trickle mode.

The computers systems 102, 104, 106, can be in the form of a desktop personal computer, a laptop computer, a networked television, a personal digital assistant, a mobile phone, and so on. The upgrade server 110 can be the primary server that responds to upgrade client requests by downloading the requested upgraded version of the application stored on the upgrade server 110 or elsewhere. The backup server 112 can respond to the upgrade client requests in the event the upgrade server 110 is unavailable. Both the upgrade server 110 and the backup server 112 can include a Web server, used to receive and respond to the upgrade client requests.

The parameter database 114 can store some or all of the parameters discussed above with respect to Tables 1, 2, and 3. The user account database 116 can store the names of users, account numbers, other user or computer terminal identifiers, user phone numbers, email addresses, physical addresses, the level of software maintenance service a given user is entitled to, the level of other services (such as telecommunications services) a given user is entitled to or subscribed to, the current version of the application installed on a given user's computer system, an installation history of the versions of the application previously installed on a given user's computer system(s), the number of installations a given user is entitled to, and so on.

Figure 2A:
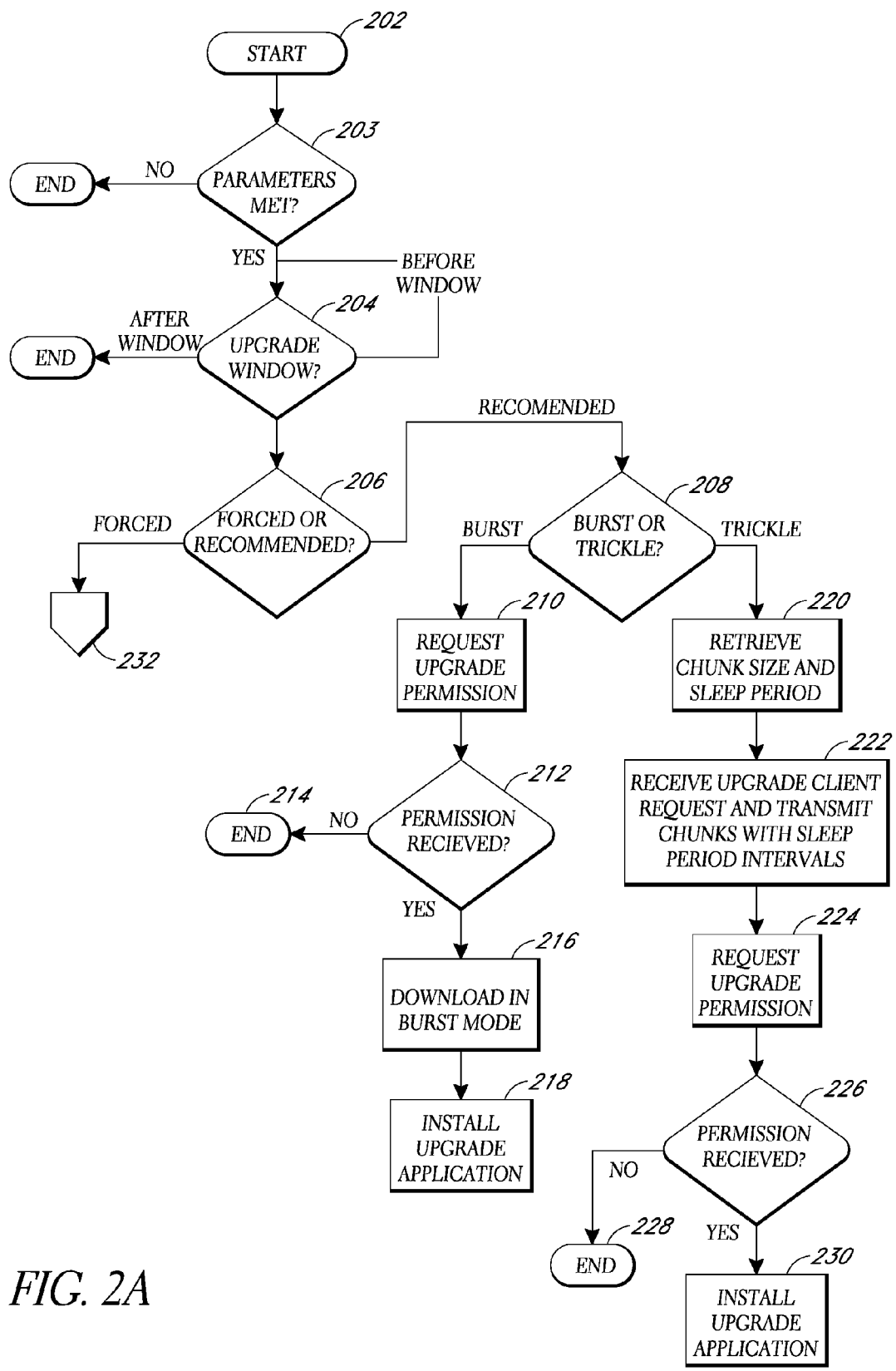
FIGS. 2A-B illustrate an example download and upgrade installation process.
Figure 2B:
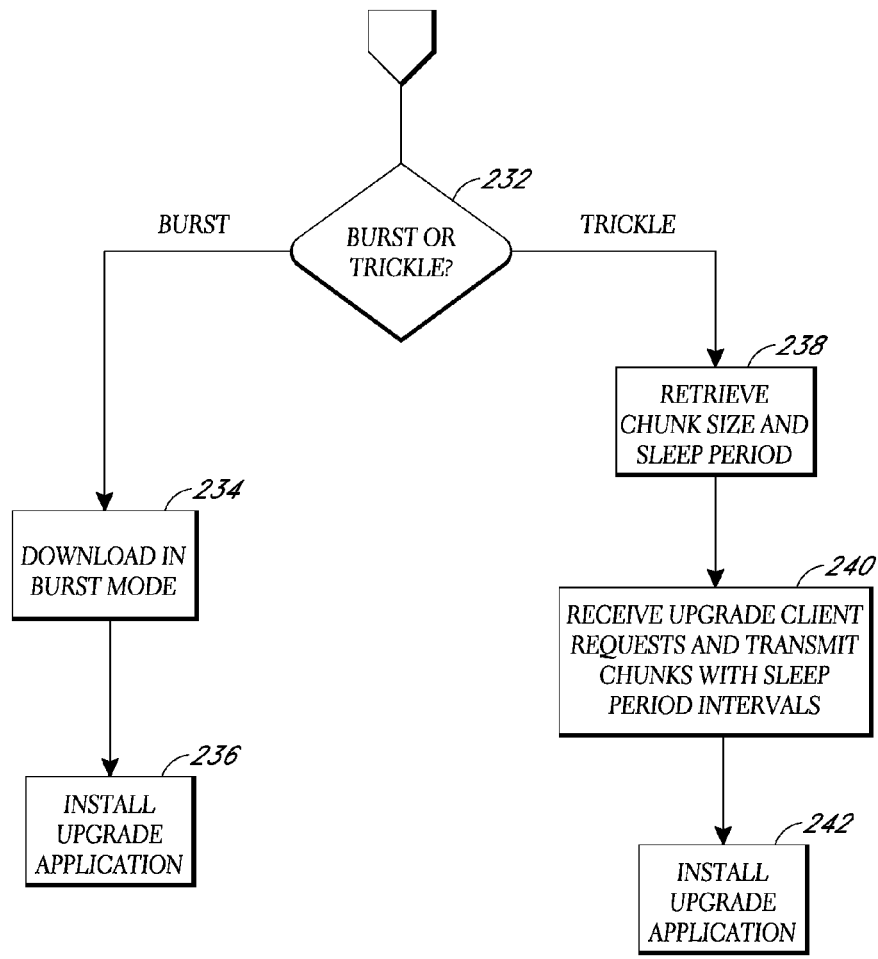

FIGS. 2A-B illustrate an example process which can be performed using the example upgrade system illustrated in FIG. 1. The process can be performed on a per user/installation basis, for a group of users/installations, or for all users/installations of a given application. Beginning at state 202, the process proceeds to state 203, where one or more parameters, such as those from Table 3, are checked, and if the specified parameters are not met, the process ends. If the parameters are met, at state 204, the upgrade system server retrieves download window start and stop dates and times, and determines when the upgrade is to be performed. If the current time is before the upgrade time window, then the process periodically checks the time until the current time is in the upgrade window. The process then proceeds to state 206. If the current time is after the end of the upgrade window, the process ends.

At state 206, the upgrade server determines whether the upgrade is to be forced or recommended. The determination can be made by retrieving a forced/recommended indication from memory, and/or the determination can be performed in real time using parameters stored in the parameter database 114 and a corresponding logical expression. If the upgrade is a recommended upgrade, the process proceeds to state 208, where a determination is made as to whether the upgrade is to be performed in burst or trickle mode. If the upgrade is to be performed in burst mode, the process proceeds to state 210.

At state 210, a transmission from the upgrade system 100 to the user computer system upgrade client causes an upgrade permission request to be presented to the user on the user's computer system. At state 212, a determination is made as to whether the user has granted permission for the upgrade to be performed. If the user did not grant permission, the process proceeds to end state 214. If permission is granted by the user, the process proceeds to state 216, and the file(s) for the upgraded version of the application is downloaded in burst mode. In the example burst mode, a server, such as a session server, communicates to the upgrade client a request for the client to start the download process. The upgrade client then contacts an upgrade server specified in the communication to start the download without specifying a chunk size limitation. The downloaded application can be in the form of one or more files, such as an executable file. The installation is then automatically performed, wherein the appropriate execution of an executable file, file copying, settings, and/or shortcut migration, is performed on the user's computer system.

If, at state 208, a determination is made that the download is to be performed in trickle mode, then the process proceeds to state 220. At state 220, the upgrade server retrieves the trickle sleep time period and chunk size, which is optionally dynamic and configurable per client version being upgraded, from the computer readable memory. At state 222, the upgrade system 100 downloads the upgrade application file(s) to the user computer system, optionally without yet requesting permission from the user. At state 224, the user is requested by the upgrade client to provide permission to install the upgraded application. At state 226, a determination is made as to whether the user responded affirmatively. If permission was not received, the process proceeds to end state 228. If permission to install the upgraded application was received, the process proceeds to state 230, and the upgraded application is installed on the user's computer system, and the appropriate file copying, settings, and/or shortcut migration, is performed.

If, at state 206, the upgrade server determines that the upgrade is to be forced, the process proceeds to state 232. At state 232, a determination is made as to whether the upgrade is to be performed in burst or trickle mode. If the upgrade is to be performed in burst mode, the process proceeds to state 234, and the download of the upgrade application file(s) to the user computer system is automatically performed in burst mode, without asking user permission. At state 236, the upgraded application is installed on the user's computer system, and the appropriate file copying, settings, and/or shortcut migration, is performed.

Figure 3:
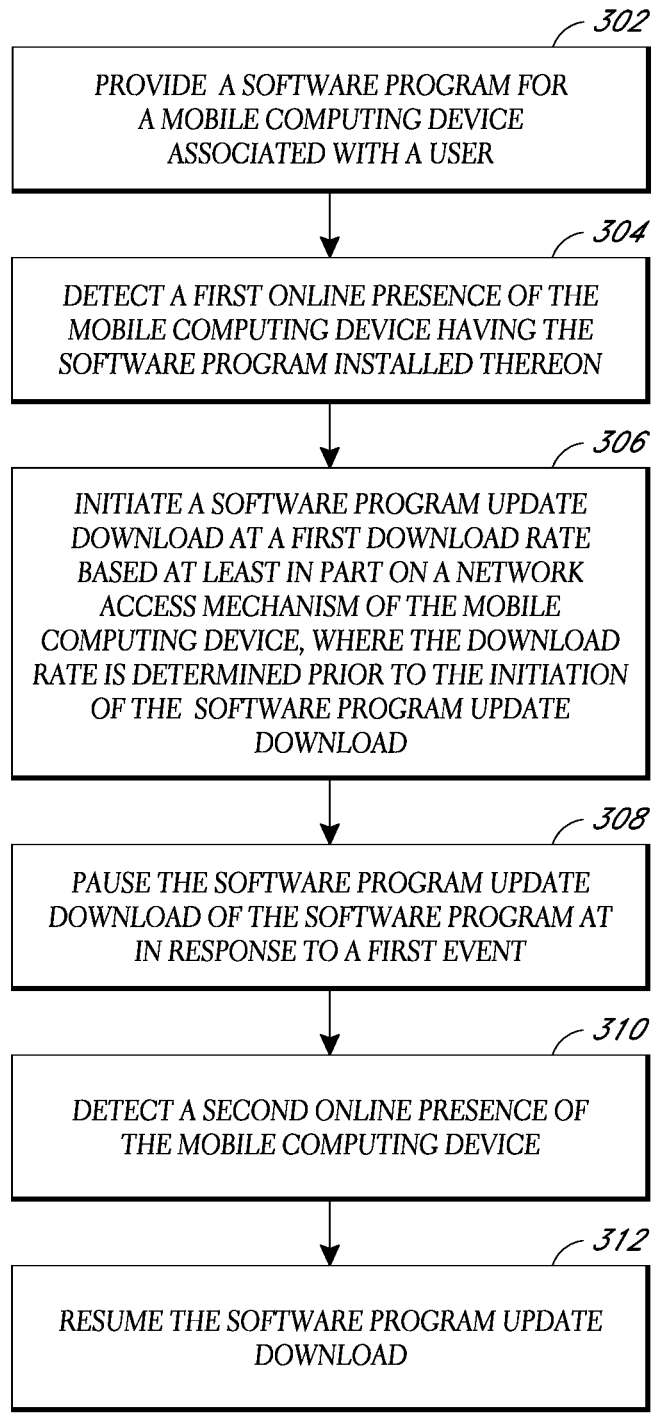
FIG. 3 illustrates an example process.

If, at state 232, a determination is made that the upgrade is to be performed in trickle mode, the process proceeds to state 238. At state 238, the upgrade server retrieves the trickle sleep time period and chunk size from the computer readable memory. At state 240, the upgrade system 100 automatically downloads the upgrade application file(s) to the user computer system. Once the download process is completed or terminated, the upgrade client verifies the download application file is valid before performing the upgrade installation. If the downloaded application file fails validation, optionally the downloaded file can be deleted by the upgrade client, and optionally the upgrade client can automatically begin the trickle download process again by re-submitting the download request to the upgrade system server. At state 242 the upgraded application is installed on the user's computer system, and the appropriate file execution, file copying, settings, and/or shortcut migration, is performed. FIG. 3 illustrates another example method of distributing a software update. At block 302, a software program is provided for a mobile computing device associated with a user. At block 304, a first online presence of the mobile computing device having the software program installed thereon is detected. At block 306, in response to the detection of an online presence of the mobile computing device, a software program update download for the software program is initiated at a first download rate, wherein the a software program update download rate to the mobile computing device is based at least in part on a network access mechanism of the mobile computing device, and the software program update download rate is determined prior to the initiation of the software program update download. At block 308, the software program update download of the software program is paused at least partly in response to a first event. At block 310, a second online presence of the mobile computing device is detected, wherein the detection of the second online presence of the mobile computing device occurs after the detection of the first online presence of the mobile computing device. At block 312, the software program update download of the software program is resumed.

Thus, as described herein, embodiments of the present invention provide for flexible downloading or transferring of files, such as upgraded applications, from one computer system to another computer system, over a network. Certain embodiments provide for forced or permission based download and/or upgrade processes, and provide for trickle and/or burst transfer of files, including upgraded application files.

It should be understood that certain variations and modifications of this invention would suggest themselves to one of ordinary skill in the art. The scope of the present invention is not to be limited by the illustrations or the foregoing descriptions thereof.

What is claimed is:

1. A method of distributing a software update, the method comprising:
  providing a software program for a mobile computing device associated with a user;
  detecting a first online presence of the mobile computing device having the software program installed thereon;
  at least partly in response to the detection of an online presence of the mobile computing device, initiating a software program update download for the software program at a first download rate,
  wherein a software program update download rate to the mobile computing device is based at least in part on a network access mechanism of the mobile computing device, and
  the software program update download rate is determined prior to the initiation of the software program update download;
  pausing the software program update download of the software program at least partly in response to a first event;
  detecting a second online presence of the mobile computing device, wherein the detection of the second online presence of the mobile computing device occurs after the detection of the first online presence of the mobile computing device; and in response to the detection of the second online presence of the mobile computing device, resume the software program update download of the software program.

2. A system, comprising:
a data store configured to store computer-executable instructions, including a software program; and
a hardware processor in communication with the data store, the hardware processor, configured to execute the computer-executable instructions, including the software program, to at least:
provide a software program for a mobile computing device associated with a user;
detect a first online presence of the mobile computing device having the software program installed thereon;
at least partly in response to the detection of the first online presence of the mobile computing device, initiate a software program update download for the software program at a first download rate,
wherein a software program update download rate to the mobile computing device is based at least in part on a level of system performance of the mobile computing device, and
the software program update download rate is determined prior to the initiation of the software program update download;
pause the software program update download of the software program at least partly in response to a first event;
detect a second online presence of the mobile computing device, wherein the detection of the second online presence of the mobile computing device occurs after the detection of the first online presence of the mobile computing device; and
in response to the detection of the second online presence of the mobile computing device, resume the software program update download of the software program.

3. The system as defined in claim 2, wherein the hardware processor is configured to execute the computer-executable instructions to cause, at least in part, an installation of the software program update to be performed in response to a user confirmation of an update notice displayed via the software program.

4. The system as defined in claim 2, wherein the user is not notified that the software program update download is occurring.

5. The system as defined in claim 2, wherein the hardware processor is configured to execute the computer-executable instructions to determine what version of the software program is installed on the mobile computing device of the user prior to downloading the software program update to the mobile computer device of the user.

6. The system as defined in claim 2, wherein the hardware processor is configured to execute the computer-executable instructions to:
read a start time period from computer readable memory; and
subsequent to the detection of the first online presence of the mobile computing device, delay the software program update initiation to a time corresponding to the start time period.

7. The system as defined in claim 2, wherein the software program comprises a photo editing application.

8. The system as defined in claim 2, wherein the second online presence detection comprises a plurality of online presence detections and the resumption of the software program update downloads of the software program comprises a plurality of resumptions until the software program update download completes.

9. The system as defined in claim 2, wherein the provided software program contains a security flaw repaired in the software program update.

10. The system as defined in claim 2, wherein the provided software program update contains a media update.

11. The system as defined in claim 2, wherein the software program comprises a call processing application.

12. A system, comprising:
a data store configured to store computer-executable instructions, including a software program; and
a hardware processor in communication with the data store, the hardware processor, configured to execute the computer-executable instructions, including the software program, to at least:
provide a software program for a mobile computing device associated with a user;
detect a first online presence of the mobile computing device having the software program installed thereon;
at least partly in response to the detection of the first online presence of the mobile computing device, initiate a software program update download for the software program at a first download rate,
wherein a software program update download rate to the mobile computing device is based at least in part on a network access mechanism of the mobile computing device, and
the software program update download rate is determined prior to the initiation of the software program update download;
pause the software program update download of the software program at least partly in response to a first event;
detect a second online presence of the mobile computing device, wherein the detection of the second online presence of the mobile computing device occurs after the detection of the first online presence of the mobile computing device; and
in response to the detection of the second online presence of the mobile computing device, resume the software program update download of the software program.

13. The system as defined in claim 12, wherein the user is not notified that the software program update download is occurring.

14. The system as defined in claim 12, wherein the hardware processor is configured to execute the computer-executable instructions to cause, at least in part, an installation of the software program update to be performed in response to a user confirmation of an update notice displayed via the software program.

15. The system as defined in claim 12, wherein the hardware processor is configured to execute the computer-executable instructions to determine what version of the software program is installed on the mobile computing device of the user prior to downloading the software program update to the mobile computer device of the user.

16. The system as defined in claim 12, wherein the hardware processor is configured to execute the computer-executable instructions to:
read a start time period from computer readable memory; and
subsequent to the detection of the first online presence of the mobile computing device, delay the software program update initiation to a time corresponding to the start time period.

17. The system as defined in claim 12, wherein the second online presence detection comprises a plurality of online presence detections and the resumption of the software program update downloads of the software program comprises a plurality of resumptions until the software program update download completes.

18. The system as defined in claim 12, wherein the provided software program contains a security flaw repaired in the software program update.

19. The system as defined in claim 12, wherein the provided software program update contains a media update.

* * * * *